(12) United States Patent
McCormack et al.

(10) Patent No.: US 9,152,656 B2
(45) Date of Patent: Oct. 6, 2015

(54) DATABASE DATA TYPE CREATION AND REUSE

(75) Inventors: Michael J. McCormack, Redmond, WA (US); Scott T. Gardner, Redmond, WA (US); Jason A. Bould, Redmond, WA (US); Sumit Chauhan, Redmond, WA (US); David J. Conger, Redmond, WA (US); Robert E. Coggins, Redmond, WA (US); Andrew R. Miller, Redmond, WA (US); Ryan McMinn, Redmond, WA (US)

(73) Assignee: MICROSOFT TECHNOLOGY LICENSING, LLC, Redmond, WA (US)

( * ) Notice: Subject to any disclaimer, the term of this patent is extended or adjusted under 35 U.S.C. 154(b) by 309 days.

(21) Appl. No.: 12/417,429

(22) Filed: Apr. 2, 2009

(65) Prior Publication Data

US 2009/0204635 A1 Aug. 13, 2009

Related U.S. Application Data

(63) Continuation-in-part of application No. 11/942,963, filed on Nov. 20, 2007, now Pat. No. 7,870,164.

(51) Int. Cl.
*G06F 17/30* (2006.01)

(52) U.S. Cl.
CPC .... *G06F 17/30289* (2013.01); *G06F 17/30292* (2013.01); *G06F 17/30342* (2013.01)

(58) Field of Classification Search
CPC ............... G06F 17/30289; G06F 17/30292; G06F 17/30342
See application file for complete search history.

(56) References Cited

U.S. PATENT DOCUMENTS

| | | | |
|---|---|---|---|
| 5,548,749 A | 8/1996 | Kroenke et al. | |
| 5,806,060 A | 9/1998 | Borgida et al. | |
| 5,826,257 A | 10/1998 | Snelling, Jr. | |
| 5,892,510 A * | 4/1999 | Lau et al. | 715/866 |
| 5,920,866 A * | 7/1999 | Crim | 1/1 |
| 5,933,820 A | 8/1999 | Beier et al. | |
| 5,966,716 A | 10/1999 | Comer et al. | |
| 6,093,215 A | 7/2000 | Buxton et al. | |
| 6,349,404 B1 | 2/2002 | Moore et al. | |
| 6,374,252 B1 * | 4/2002 | Althoff et al. | 1/1 |

(Continued)

OTHER PUBLICATIONS

Primasoft PC: "Digital Document Manager" http://www.programurl.com/digital-document-manager.htm, Jul. 17, 2007, pp. 1-3.

(Continued)

*Primary Examiner* — Daniel Kinsaul
(74) *Attorney, Agent, or Firm* — Damon Rieth; Danielle Johnston-Holmes; Micky Minhas

(57) ABSTRACT

Embodiments are provided for creating and reusing custom data types in a database. A selection of a field or group of fields may be received from a database table in the database by a database software application executing on a computer system. Each selected field may include a set of field properties. The application may further receive a user input to initiate saving the selected field or group of fields as a custom data type. In response to receiving the input, the application may be configured to generate a dialog for receiving custom data type information for the selected field or group of fields and save the selected field or group of fields as a custom data type. The custom data type may then be reused by the application in the database.

19 Claims, 8 Drawing Sheets

(56) References Cited

U.S. PATENT DOCUMENTS

| | | | |
|---|---|---|---|
| 6,401,220 B1* | 6/2002 | Grey et al. | 714/33 |
| 6,507,855 B1 | 1/2003 | Stern | |
| 6,526,423 B2 | 2/2003 | Zawadzki et al. | |
| 6,604,100 B1 | 8/2003 | Fernandez et al. | |
| 6,618,736 B1 | 9/2003 | Menage | |
| 6,868,413 B1 | 3/2005 | Grindrod et al. | |
| 7,010,546 B1* | 3/2006 | Kolawa et al. | 707/694 |
| 7,020,660 B2 | 3/2006 | Woodring | |
| 7,092,933 B1* | 8/2006 | Milby | 707/702 |
| 7,240,073 B2 | 7/2007 | Benson et al. | |
| 7,269,593 B2 | 9/2007 | Minamino et al. | |
| 7,287,218 B1 | 10/2007 | Knotz et al. | |
| 7,302,444 B1 | 11/2007 | Dunmore et al. | |
| 7,376,891 B2 | 5/2008 | Hitchock | |
| 7,480,670 B1* | 1/2009 | Milby | 1/1 |
| 7,549,116 B1* | 6/2009 | Garcowski et al. | 715/212 |
| 7,610,548 B1 | 10/2009 | Brinkman et al. | |
| 7,711,675 B2 | 5/2010 | Anonsen | |
| 7,725,501 B1 | 5/2010 | Stillman et al. | |
| 7,761,848 B1 | 7/2010 | Chaffin | |
| 7,801,886 B1* | 9/2010 | Gabriel et al. | 707/715 |
| 7,870,164 B2 | 1/2011 | Miller et al. | |
| 2002/0054155 A1* | 5/2002 | Churchill et al. | 345/826 |
| 2003/0036925 A1 | 2/2003 | Miller | |
| 2003/0115176 A1 | 6/2003 | Bobroff | |
| 2004/0036722 A1* | 2/2004 | Warren | 345/866 |
| 2004/0078288 A1 | 4/2004 | Forbis et al. | |
| 2004/0093596 A1 | 5/2004 | Koyano | |
| 2004/0153462 A1 | 8/2004 | Bardwell | |
| 2004/0243550 A1 | 12/2004 | Gu et al. | |
| 2004/0267766 A1* | 12/2004 | Marek et al. | 707/100 |
| 2005/0065942 A1 | 3/2005 | Diab | |
| 2005/0066050 A1 | 3/2005 | Dharamshi | |
| 2005/0132328 A1* | 6/2005 | Bulusu | 717/114 |
| 2005/0149545 A1* | 7/2005 | Zenz | 707/101 |
| 2005/0171863 A1* | 8/2005 | Hagen | 705/26 |
| 2005/0172221 A1 | 8/2005 | Kobashi et al. | |
| 2005/0177589 A1* | 8/2005 | Venkatesh et al. | 707/102 |
| 2005/0207635 A1 | 9/2005 | Lazar et al. | |
| 2005/0223022 A1* | 10/2005 | Weissman et al. | 707/102 |
| 2005/0262108 A1 | 11/2005 | Gupta | |
| 2006/0005127 A1 | 1/2006 | Ferguson et al. | |
| 2006/0036656 A1* | 2/2006 | Mercer | 707/203 |
| 2006/0036998 A1 | 2/2006 | McKenna et al. | |
| 2006/0074936 A1 | 4/2006 | Behrens | |
| 2006/0095833 A1 | 5/2006 | Orchard et al. | |
| 2006/0117294 A1 | 6/2006 | Volger | |
| 2006/0167760 A1 | 7/2006 | Chakraborty et al. | |
| 2006/0167860 A1 | 7/2006 | Eliashberg et al. | |
| 2006/0197982 A1 | 9/2006 | Bell et al. | |
| 2006/0277209 A1 | 12/2006 | Kral et al. | |
| 2007/0038651 A1 | 2/2007 | Bernstein et al. | |
| 2007/0038924 A1 | 2/2007 | Beyer et al. | |
| 2007/0038929 A1 | 2/2007 | Miyazawa | |
| 2007/0038948 A1 | 2/2007 | Cornacchia | |
| 2007/0041545 A1 | 2/2007 | Gainsboro | |
| 2007/0055943 A1* | 3/2007 | McCormack et al. | 715/746 |
| 2007/0088741 A1 | 4/2007 | Brooks et al. | |
| 2007/0094340 A1* | 4/2007 | Zondervan et al. | 709/206 |
| 2007/0100471 A1* | 5/2007 | Kumar et al. | 700/18 |
| 2007/0112825 A1 | 5/2007 | Cook et al. | |
| 2007/0192671 A1 | 8/2007 | Rufener | |
| 2007/0198564 A1 | 8/2007 | Blackstone et al. | |
| 2007/0203935 A1 | 8/2007 | de Souza | |
| 2007/0299823 A1 | 12/2007 | Getsch | |
| 2008/0065634 A1 | 3/2008 | Krinsky | |
| 2008/0065978 A1 | 3/2008 | Francker et al. | |
| 2008/0077552 A1 | 3/2008 | Sanborn | |
| 2008/0082495 A1 | 4/2008 | Polo-Valouvier et al. | |
| 2008/0091709 A1 | 4/2008 | Chang et al. | |
| 2008/0098291 A1 | 4/2008 | Bradley et al. | |
| 2008/0127186 A1 | 5/2008 | Kanodia et al. | |
| 2008/0270985 A1 | 10/2008 | McCormack et al. | |
| 2008/0288301 A1 | 11/2008 | Emling et al. | |
| 2009/0132576 A1 | 5/2009 | Miller et al. | |
| 2009/0158134 A1 | 6/2009 | Wang et al. | |
| 2009/0235164 A1 | 9/2009 | Wason | |
| 2009/0248740 A1 | 10/2009 | McCormack et al. | |
| 2010/0036676 A1 | 2/2010 | Safdi et al. | |
| 2010/0153834 A1 | 6/2010 | Abe | |
| 2012/0066692 A1* | 3/2012 | Jia | 719/313 |

OTHER PUBLICATIONS

Sing L: "Client and server-side templating with Velocity—Basic template engine operation", http://www.developertutorials.com/tutorials/java/templating-with-velocity/page2.html, Jul. 17, 2007, pp. 1-5.

BEA Weblogic Workshop Help. Verrsion 8.1 SP4, Dec. 2004, pp. 1-180. http://edocs.bea.com/workshop/docs81/pdf/files/portal/Portal.JSPTags.pdf.

Sing Ali: "Client and Server-Side Templating with Velocity", Jun. 13, 2004, pp. 1-5 http://www.developertutorials.com/tutorials/java/templating-with-velocity/page2.html.

"Digital Document Manager" http://www.programurl.com/digital-document-manager.htm, Jul. 17, 2007, pp. 1-3.

Sing Li: "Client and server-side templating with Velocity—Basic template engine operation", http://www.developertutorials.com/tutorials/java/templating-with-velocity/page2.html, Jun. 3, 2004, pp. 1-5.

Microsoft Business Solutions for Analytics-Great Plains, Jun. 2003, pp. 1-16 http://download.microsoft.com/download/4/8/8/4884dcc2-bd71-4286-bfb7-e1360bb38a87/GreatPlains_Analytics.pdf.

Official Action mailed Feb. 23, 2010, 2010 in U.S. Appl. No. 11/942,963, pp. 1-12.

Official Action mailed Jul. 23, 2010, 2010 in U.S. Appl. No. 11/942,963, pp. 1-10.

U.S. Official Action mailed Jun. 8, 2011 in U.S. Appl. No. 12/417,508.

U.S. Office Action mailed Oct. 14, 2011 in U.S. Appl. No. 12/417,508, 22 pages.

Official Action mailed Jul. 12, 2012 in U.S. Appl. No. 12/417,508, 32 pages.

Dai. W .. et al; "Reusable Template for Product Database Development"; http://ieeexplore.ieee.org/xpl/freeabs_alLjsp?tp=&arnumber=571215&isnumber=12290; 0-7803-3280-06/96; PubL 1996 IEEE; pgs. 994-997.

Chaudhry, N., et al; "A Formal Model for Rule Inheritance and Overriding in Active Object-Oriented Databases"; PubL 1998; 8 pgs.

Everything2.com; "Inheritance in Relational Databases"; http://www.everything2.com/index.pl?node_id=1796637; Apr. 2, 2006; 4 pgs.

U.S. Official Action dated May 7, 2012 cited in U.S. Appl. No. 11/742,356, 18 pgs.

U.S. Official Action dated Aug. 29, 2012 cited in U.S. Appl. No. 11/742,356, 17 pgs.

U.S. Official Action dated Feb. 11, 2013 cited in U.S. Appl. No. 11/742,356, 14 pgs.

U.S. Official Action dated Jun. 27, 2013 cited in U.S. Appl. No. 11/742,356, 15 pgs.

U.S. Official Action dated Sep. 11, 2014 cited in U.S. Appl. No. 11/742,356, 29 pgs.

Notice of Allowance dated Mar. 25, 2015 cited in U.S. Appl. No. 11/742,356, 5 pgs.

* cited by examiner

CREATE NEW DATA TYPE FROM FIELDS

- NAME: _____ — 410
- ICON:  — 420
- CATEGORY: USER TYPES ▽ — 430
- PREVIEW IMAGE:  — 440
- DESCRIPTION: _____ — 450
- IMPORTANT TABLE: ISSUES ▽
- INSTANTIATION FORM: INSTANTIATION FORM NAME ▽
- DESCRIPTION: _____

[<<LESS]   [OK]   [CANCEL]

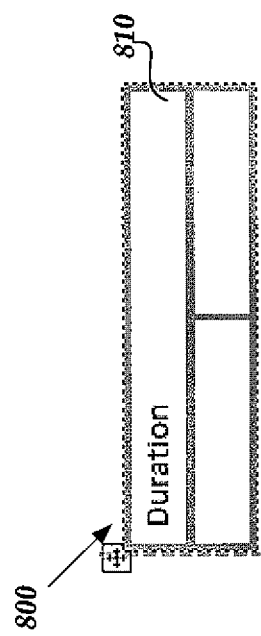

DATABASE DATA TYPE CREATION AND REUSE

CROSS-REFERENCE TO RELATED APPLICATIONS

This application is a continuation in part of U.S. patent application Ser. No. 11/942,963, now U.S. Pat. No. 7,870,164 filed on Nov. 20, 2007, and entitled "Database Part Creation, Merge and Reuse," the disclosure of which is hereby incorporated herein, in its entirety, by reference.

COPYRIGHT NOTICE

A portion of the disclosure of this patent document contains material which is subject to copyright protection. The copyright owner has no objection to the facsimile reproduction by anyone of the patent document or the patent disclosure, as it appears in the Patent and Trademark Office patent file or records, but otherwise reserves all copyright rights whatsoever.

BACKGROUND

Many database software applications allow the creation and utilization of database templates to facilitate the building of solutions using database data. The database software applications utilize a set of predefined data types (e.g., text, number, currency, etc.) to create templates which may comprise forms and reports for entering data into various fields corresponding to a predefined data type (e.g., text).

Currently however, the predefined data types provided by database software applications suffer from a number of drawbacks. One drawback is that users are restricted to using default properties associated with predefined data types which cannot easily be modified by the average database user. Another drawback associated with current database software applications is that there is currently not an easy way for average database users to combine data types for use (and reuse) as a single data type. It is with respect to these considerations and others that the various embodiments of the present invention have been made.

SUMMARY

This summary is provided to introduce a selection of concepts in a simplified form that are further described below in the Detailed Description. This summary is not intended to identify key features or essential features of the claimed subject matter, nor is it intended as an aid in determining the scope of the claimed subject matter.

Embodiments are provided for creating and reusing custom data types in a database. A selection of a field or group of fields may be received from a database table in the database by a database software application executing on a computer system. Each selected field may include a set of field properties. The application may further receive a user input to initiate saving the selected field or group of fields as a custom data type. In response to receiving the input, the application may be configured to generate a dialog for receiving custom data type information for the selected field or group of fields and save the selected field or group of fields as a custom data type. The custom data type may then be reused by the application in the database.

These and other features and advantages will be apparent from a reading of the following detailed description and a review of the associated drawings. It is to be understood that both the foregoing general description and the following detailed description are illustrative only and are not restrictive of the invention as claimed.

BRIEF DESCRIPTION OF THE DRAWINGS

FIG. 4 is a computer screen display of a user interface which may be utilized to receive custom data type information, in accordance with an embodiment;

FIG. 8 is a diagram of a stacked configuration of database fields defined by a field group layout template, in accordance with an embodiment.

DETAILED DESCRIPTION

Figure 1:
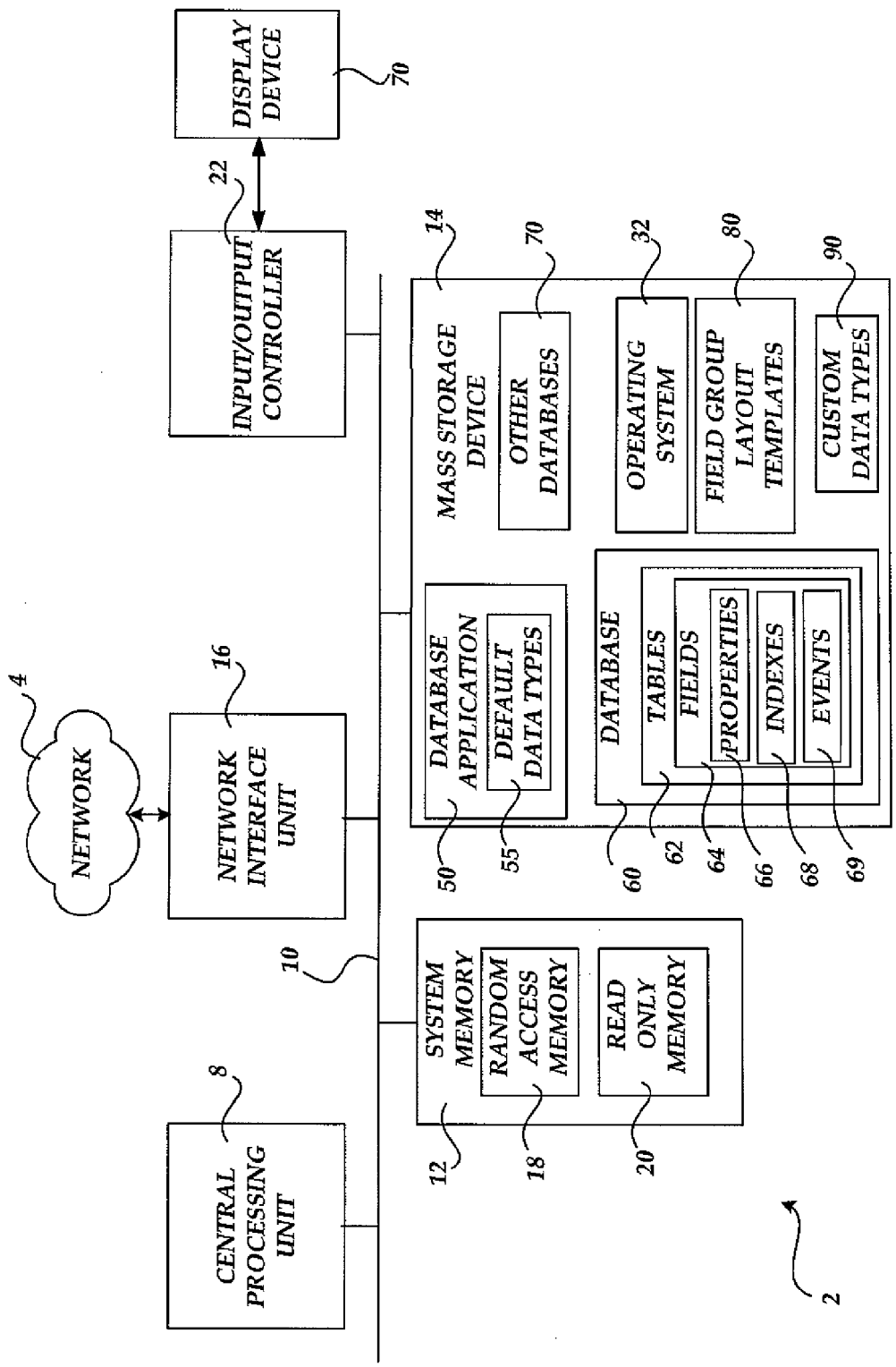
FIG. 1 shows a block diagram illustrating a computing environment which may be utilized for merging, managing, creating, and reusing database parts, in accordance with various embodiments.

Embodiments are provided for creating and reusing custom data types in a database. A selection of a field or group of fields may be received from a database table in the database by a database software application executing on a computer system. Each selected field may include a set of field properties. The application may further receive a user input to initiate saving the selected field or group of fields as a custom data type. In response to receiving the input, the application may be configured to generate a dialog for receiving custom data type information for the selected field or group of fields and save the selected field or group of fields as a custom data type. The custom data type may then be reused by the application in the database.

Referring now to the drawings, in which like numerals represent like elements, various illustrative embodiments will now be described.

Exemplary Operating Environment

Referring now to FIG. 1, the following discussion is intended to provide a brief, general description of a suitable computing environment in which various illustrative embodiments may be implemented. While various embodiments will be described in the general context of program modules that execute in conjunction with program modules that run on an operating system on a personal computer, those skilled in the art will recognize that the various embodiments may also be implemented in combination with other types of computer systems and program modules.

Generally, program modules include routines, programs, components, data structures, and other types of structures that perform particular tasks or implement particular abstract data types. Moreover, those skilled in the art will appreciate that the various embodiments may be practiced with other computer system configurations, including handheld devices, multiprocessor systems, microprocessor-based or programmable consumer electronics, minicomputers, mainframe computers, and the like. The various embodiments may also be practiced in distributed computing environments where tasks are performed by remote processing devices that are linked through a communications network. In a distributed computing environment, program modules may be located in both local and remote memory storage devices.

FIG. 1 shows a computer 2 which may include a general purpose desktop, laptop, handheld, tablet, or other type of computer capable of executing one or more application programs. The computer 2 includes at least one central processing unit 8 ("CPU"), a system memory 12, including a random access memory 18 ("RAM") and a read-only memory ("ROM") 20, and a system bus 10 that couples the memory to the CPU 8. A basic input/output system containing the basic routines that help to transfer information between elements within the computer, such as during startup, is stored in the ROM 20.

The computer 2 further includes a mass storage device 14 for storing an operating system 32, a database application 50, a database 60, other databases 70, field group layout templates 80, and custom data types 90. In accordance with various embodiments, the operating system 32 may be suitable for controlling the operation of a networked personal computer, such as the WINDOWS operating systems from MICROSOFT CORPORATION of Redmond, Wash.

The database application 50 may comprise the ACCESS database creation and management desktop application program, also from MICROSOFT CORPORATION of Redmond, Wash. The database application 50 may include default data types 55 (e.g., text, number, currency, etc.) which may be used to create templates comprising forms and reports for entering data into various database table fields. Illustrative data types which may be included in the default data types 55 will be described in greater below in the discussion of FIG. 3

The database 60 may include database tables 62. The database tables 62 may include database fields 64. Each of the database fields 64 may include properties (i.e., field properties) 66, indexes 68, and events 69. The properties 66 may include, for example, a validation rule for formatting a number data type as a telephone number. For example, one property associated with the data type may include restricting the total numbers the data type will accept to ten digits (corresponding, for example, to a U.S. telephone number). Another property associated with the data type may include an input mask in which the first three digits of the telephone number (i.e., the area code) are displayed in parentheses in a database. The indexes 68 may include references to certain fields in a database which will be frequently searched and thus will be treated differently from other fields by the database application program 50. For example, if a customer ID field in a customer database will be frequently used in performing database searches, this field may be assigned as an index field in the database. It will be appreciated that assigning fields as index fields tells the database which fields are important and thereby improving database performance. The events 69 may include field specific events which are actions associated with certain database fields. In accordance with an embodiment, a field specific event may include a macro which automatically triggers an action associated with a database field. For example, a field specific event may comprise an action which automatically sends an e-mail to a department manager each time a cell phone number is entered into an employee database field.

As will be described in greater detail below with respect to FIG. 2, the custom data types 90 may be created by the database application 50 using a selection of one or more of the fields 64 in the database 60. The other databases 70 may include additional databases which may include some or all of the components discussed above with respect to the database 60. In accordance with an embodiment the database application 50 may be configured to reuse the custom data types 90, which are created using the database 60, in the other databases 70.

The field group layout templates 80 may include instructions which may be utilized by the database application program 50 for displaying a group of database fields within a database form or report. In accordance with an embodiment, the field group layout templates 80 may include markup language defining a visual layout of database fields. The field group layout templates 80 will be described in greater detail below in the discussion of FIGS. 6-8.

The mass storage device 14 is connected to the CPU 8 through a mass storage controller (not shown) connected to the bus 10. The mass storage device 14 and its associated computer-readable media provide non-volatile storage for the computer 2. Although the description of computer-readable media contained herein refers to a mass storage device, such as a hard disk or CD-ROM drive, it should be appreciated by those skilled in the art that computer-readable media can be any available media that can be accessed or utilized by the computer 2. By way of example, and not limitation, computer-readable media may comprise computer storage media and communication media.

Computer storage media includes volatile and non-volatile, removable and non-removable hardware storage media implemented in any physical method or technology for the storage of information such as computer-readable instructions, data structures, program modules or other data. Computer storage media includes, but is not limited to, RAM, ROM, EPROM, EEPROM, flash memory or other solid state memory technology, CD-ROM, digital versatile disks ("DVD"), or other optical storage, magnetic cassettes, magnetic tape, magnetic disk storage or other magnetic storage devices, which can be used to store the desired information and which can be accessed by the computer 2. Communication media typically embodies computer-readable instructions, data structures, program modules or other data in a modulated data signal such as a carrier wave or other transport mechanism and includes any information delivery media. The term "modulated data signal" means a signal that has one or more of its characteristics set or changed in such a manner as to encode information in the signal. By way of example, and not limitation, communication media includes wired media such as a wired network or direct-wired connection, and wireless media such as acoustic, RF, infrared, and other wireless media. Combinations of any of the above should also be included within the scope of computer-readable media. Computer-readable media may also be referred to as a computer program product.

According to various embodiments of the invention, the computer 2 may operate in a networked environment using logical connections to remote computers through a network 4, such as a local network or a wide area network (e.g., the Internet), for example. The computer 2 may connect to the network 4 through a network interface unit 16 connected to the bus 10. It should be appreciated by those skilled in the art that when operating in a networked environment, the computer 2 may be in communication with one or more remote servers hosting a shared database services platform such as the EXCEL/ACCESS SERVICES platform from Microsoft Corporation of Redmond, Wash. It should be appreciated that the network interface unit 16 may also be utilized to connect to other types of networks and remote computing systems. The computer 2 may also include an input/output controller 22 for receiving and processing input from a number of input types, including a keyboard, mouse, pen, stylus, finger, and/or other means. Similarly, an input/output controller 22 may provide output to a display device 70, a printer, or other type of output device. Additionally, a touch screen can serve as an input and an output mechanism.

Figure 2:
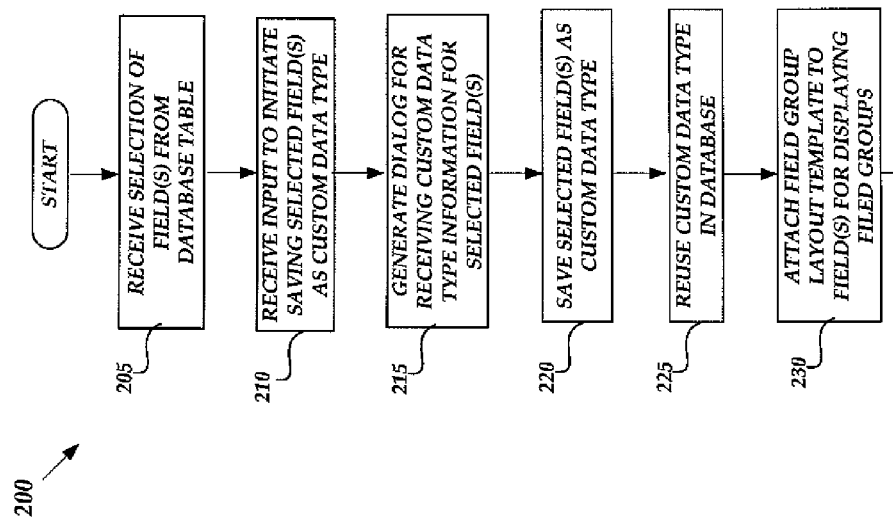
FIG. 2 shows a flow diagram illustrating a routine for creating and reusing custom data types in a database, in accordance with an embodiment.

FIG. 2 is a flow diagram illustrating a routine 200 for creating and reusing custom data types in a database, in accordance with an embodiment. The components of FIG. 1 are referred to in the description of FIG. 2, but the embodiment is not so limited. When reading the discussion of the routines presented herein, it should be appreciated that the logical operations of various embodiments of the present invention are implemented (1) as a sequence of computer implemented acts or program modules running on a computing system and/or (2) as interconnected machine logical circuits or circuit modules within the computing system. The implementation is a matter of choice dependent on the performance requirements of the computing system implementing the invention. Accordingly, the logical operations illustrated in FIG. 2 and making up the various embodiments described herein are referred to variously as operations, structural devices, acts or modules. It will be recognized by one skilled in the art that these operations, structural devices, acts and modules may be implemented in software, in firmware, in special purpose digital logical, and any combination thereof without deviating from the spirit and scope of the present invention as recited within the claims set forth herein.

The routine 200 begins at operation 205, where the database application 50 executing on the computer 2 receives a selection of one or more of the fields 64 from a database table 62 in the database 60. In accordance with an embodiment, a user may select a group of fields corresponding to multiple pre-defined or default data types (e.g., the default data types 55). For example, a user may select a group of fields comprising different data types and/or properties such as a mailing address including a street address field (having a memo data type with a property allowing lengthy text or combinations of text and numbers up to a predetermined number of characters), a city field (having a text data type with a property limiting text to fifty characters), a state/province filed (having a text data type with a property limiting text to two characters), and a zip/postal code field (having a text data type with a property limiting text to fifteen characters), and a country field (having a text data type with a property limiting text to 255 characters). As another example, the user may select a group of fields having the same data type and properties such as a start date field and an end date field (both having a "Date Time" data type with a "Medium" date property as well as having the same field validation rules and events). It will be appreciated that, in accordance with another embodiment, data types for creating one or more custom data types may be selected by dragging and dropping the data types from a user interface gallery of data types into the table 62 by a user.

From operation 205, the routine 200 continues to operation 210, where the database application 50 receives an input to initiate the saving of the selected field or fields 64 as a custom data type. In particular, after receiving the selection of the fields 64, the database application 50 may receive an input in a user interface to initiate the saving of the selected fields 64 as a custom or new data type. An illustrative user interface for saving the selected fields 64 as a new data type will be described below in the description of FIG. 3.

From operation 210, the routine 200 continues to operation 215, where the database application 50 generates a dialog for receiving information about the new or custom data type 90 to be created from the selected field or fields 64. The information may include a name, an icon, category, a preview image, and a description for the custom data type 90. An illustrative user interface for receiving information about the new or custom data type 90 to be created from the selected fields 64 will be described below in the description of FIG. 4.

From operation 215, the routine 200 continues to operation 220, where the database application 50 saves the selected field or fields 64 as a custom data type 90. In particular, the database application 50 may be configured to save the data types and/or properties for a field or group of fields 64 as a single data type including the properties 66 associated with each individual field 64 (i.e., a set of field properties), any indexes 68 associated with each individual field 64, and any field specific events 69 associated with each individual field 64. The database application 50 may further be configured to use the custom data type information received at operation 210 to generate a name, icon, category, preview image, and a description for the custom data type 90 to be displayed in a user interface toolbar of data types (generated by the database application 50) for use and reuse by a user. As a result, a user does not have to manually reselect the same fields to create and reuse a data type to create a database template. An illustrative user interface for displaying a created custom data type 90 for use and reuse will be described below in the description of FIG. 5.

From operation 220, the routine 200 continues to operation 225, where the database application 50 may, in response to a user input, use and reuse the custom data type 90 saved at operation 220. For example, a user may select the custom data type 90 to reuse in creating a new database template (e.g., a form or report) from a data type gallery to which the custom data type 90 has been added by the database application 50. In accordance with an embodiment, the custom data type 90 may be reused in the database 60 or in the other databases 70.

From operation 225, the routine 200 continues to operation 230, where the database application 50 may attach a field group layout template 80 to one or more fields 64 representing the custom data type 90. The field group layout template 80 may be attached to any field 64 in a group of fields comprising the custom data type 90. In accordance with an embodiment, the field group layout template 80 is attached to the first field 64 in the field group as a default setting. In accordance with an embodiment, the field group layout template 80 may be described by a markup language (e.g., the extensible markup language) which defines the layout of the fields 64 in a field group comprising the custom data type 90, within a form or report in a database. For example, the field group layout template 80 may define a layout in which the fields 64 comprising the custom data type 90 are laid out in either a stacked formation or a tabular formation within a form or report in the database 60 or in the other databases 70. In accordance with an alternative embodiment, the layout of the fields 64 may based on the type of layout and metadata stored within one of the fields in a field group upon dragging and dropping a field group node (i.e., a field in the field group) into a layout. From operation 225, the routine 200 then ends.

Figure 3:
FIG. 3 shows a computer screen display of a user interface which may be utilized to initiate the creation of custom data types for use in a database, in accordance with an embodiment.

FIG. 3 shows a computer screen display of a user interface 300 which may be utilized to initiate the creation of custom data types for use in a database, in accordance with an embodiment. The user interface 300 includes a gallery of default data types 55 including basic types 310, number 320, and date and time 330. The user interface 300 also includes a user interface button 340 to initiate the saving of a selection, from the table 62 in the database 60, of the fields 64 (including the properties 66, the indexes 68, and the events 69) as a new or custom data type. It should be understood that the user interface 300 may also be utilized to select data type templates, in accordance with an embodiment.

FIG. 4 is a computer screen display of a user interface 400 which may be utilized to receive custom data type information, in accordance with an embodiment. The user interface 400 includes a Name text box 410, an Icon text box 420, a Category combo box 430, a Preview Image text box 440, and a Description text box 450. The Name text box 410 may be utilized by a user of the database application 50 to specify a name of the custom data type 90 to be created. The Icon text box 420 may be utilized by the database application 50 to display a file location of an icon image selected by a user to represent the custom data type 90. The Category combo box 430 may be utilized by a user of the database application 50 to select a category for the custom data type 90 to appear in. In particular, a user may select a category from a drop-down list of known database type categories (for example, "Basic Types") in the Category combo box 430. The user may also enter a string in the Category box 430 to define a new data type category. The Preview Image text box 440 may be utilized by a user of the database application 50 to display a file location of an image file selected by a user to serve as a preview image for the custom data type 90. The Description text box 450 may be utilized by a user of the database application 50 to enter a description to be used for the custom data type 90.

Figure 5:
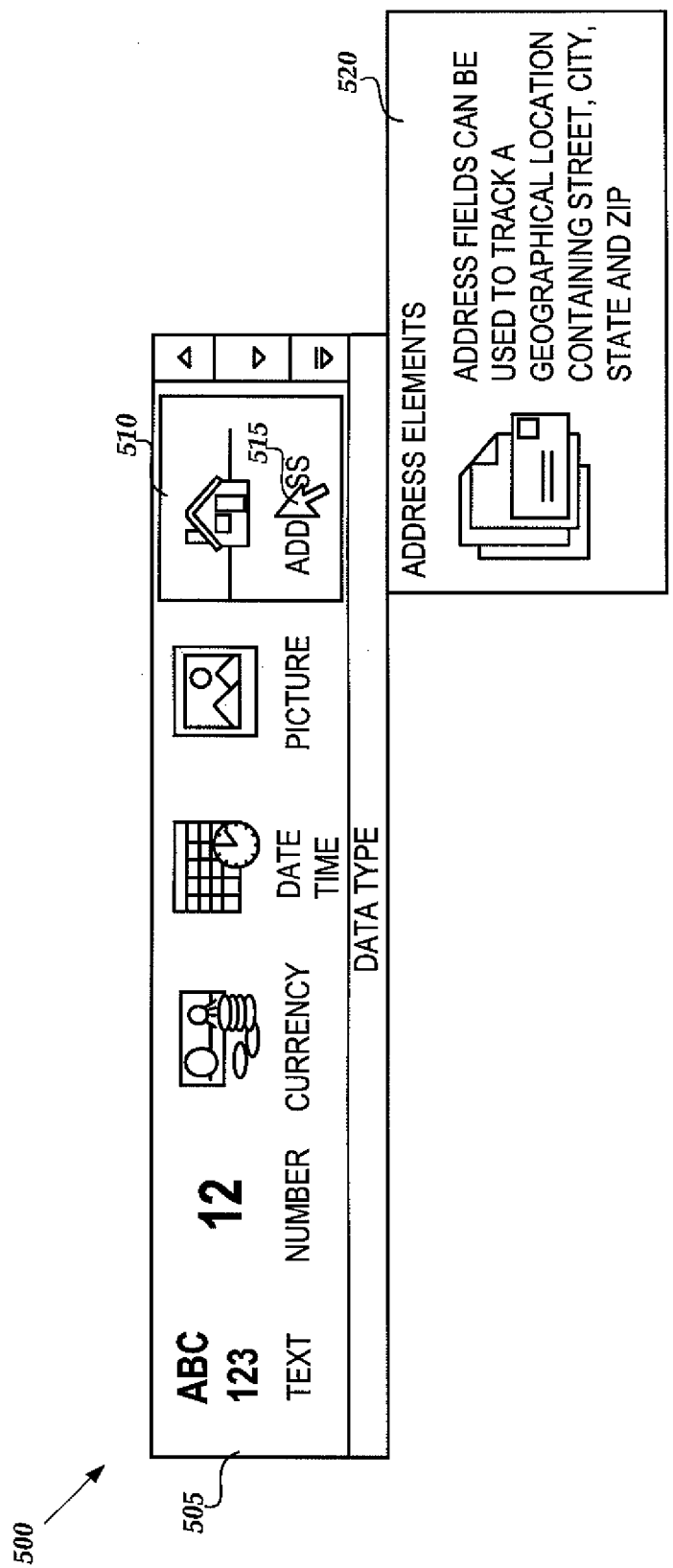
FIG. 5 is a computer screen display of a user interface which may be utilized to reuse a custom data type, in accordance with an embodiment.

FIG. 5 is a computer screen display of a user interface 500 which may be utilized to reuse a custom data type 90, in accordance with an embodiment. It should be understood that the user interface 500 may comprise a collapsed state of the user interface 300, discussed above. The user interface 500 includes a tool bar 505 representing various default data types as well as an icon 510 representing an address custom data type. The user interface 500 also includes a description box 520 which may be generated when a pointer 515 hovers over the icon 510 and which describes the fields comprising the address custom data type as well as a preview image. It will be appreciated that the icon 510 and the description box 520 may be defined by a user with custom data type information received in the user interface 400, discussed above.

Figure 6:
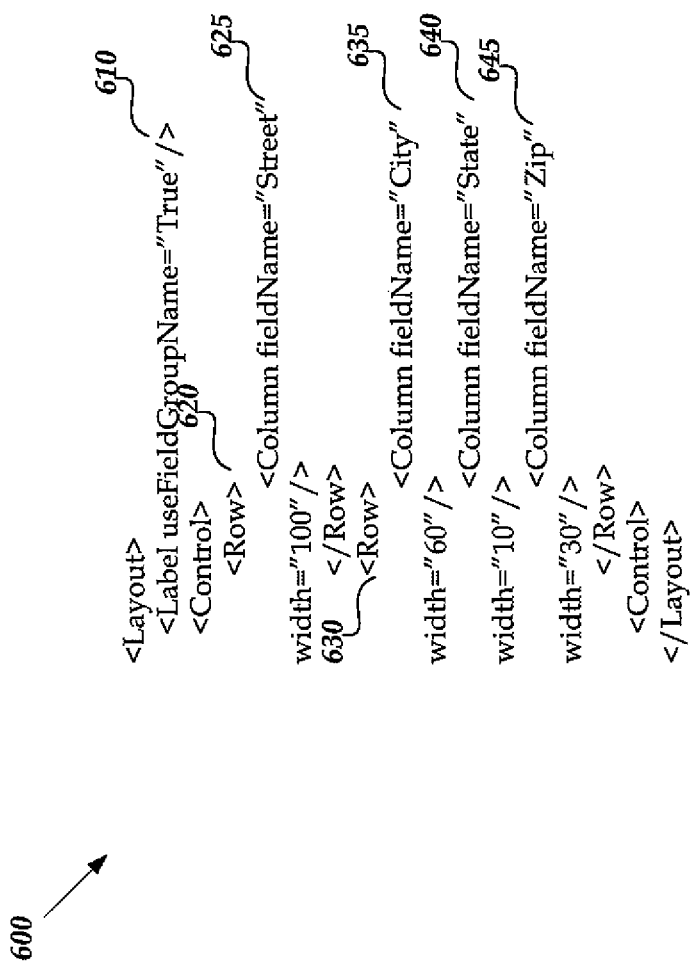
FIG. 6 shows a markup language document comprising tags which may be utilized to define a layout structure used in a field group layout template, in accordance with an embodiment.

FIG. 6 shows a markup language document 600 comprising tags which may be utilized to define a layout structure used in a field group layout template 80, in accordance with an embodiment. The markup language document 600 includes a <Label> tag 610, a <Row> tags 620 and 630, and <Column> tags 625, 635, 640, and 645. The <Label> tag 610 includes a "useFiledGroupName" attribute which is used to determine whether or not to use a field group name for the field group layout template 80. The <Row> tag 620 designates a first row of the field group layout of a form or report using the field group layout template 80. The <Column> tag 625 includes a "Column fieldname" attribute and is used to identify the name of a field 64 in an address custom data type (i.e., "Street") to be used in the first row of the field group layout of a form or report using the field group layout template 80. The <Row> tag 630 designates a second row of the field group layout of a form or report using the field group layout template 80. The <Column> tags 635, 640, and 645, each include a "Column fieldname" attribute used to identify the names of the fields 64 in the address custom data type (i.e., "City," "State," and "Zip") to be used in the second row of the field group layout of a form or report using the field group layout template 80. The attributes for the <Column> tags 625, 635, 640, and 645 also define a field width for entering text and/or numbers associated with each address data type field.

Figure 7:
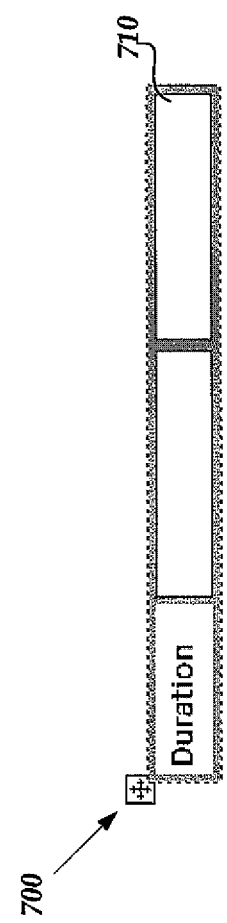
FIG. 7 shows a diagram of a tabular configuration of database fields defined by a field group layout template, in accordance with an embodiment.

FIG. 7 shows a diagram 700 of a tabular configuration 700 of the fields 64 defined by a field group layout template 80, in accordance with an embodiment. FIG. 8 shows a diagram 800 of a stacked configuration 810 of database fields defined by a field group layout template 80, in accordance with an embodiment.

Although the invention has been described in connection with various illustrative embodiments, those of ordinary skill in the art will understand that many modifications can be made thereto within the scope of the claims that follow. Accordingly, it is not intended that the scope of the invention in any way be limited by the above description, but instead be determined entirely by reference to the claims that follow.

What is claimed is:

1. A computer-implemented method for creating and reusing custom data types in a database, comprising:
   providing a user interface gallery displaying a plurality of rows of default data types, the displayed plurality of rows of the default data types comprising a plurality of disparate data types and a plurality of data type categories, the user interface gallery further displaying at least one of the plurality of data type categories as one of the default data types in another one of the plurality of data type categories, the default data types being associated with a displayed database, the default data types being utilized in creating the custom data types;
   receiving, by the computer, a selection of a first field and a second field from a database table in the database, the first field and the second field comprising a set of field properties;
   receiving, in the user interface gallery, an input to initiate saving the field properties associated with the selected first field and second field for creating a custom data type;
   generating a dialog for receiving custom data type information, the custom data type information including any one of: a name, an icon, a category, a preview image or a description;
   saving the field properties and the custom data type information as the custom data type;
   displaying the custom data type in the user interface gallery;
   receiving a selection of the custom data type from the user interface gallery, the custom data type comprising a plurality of the default data types displayed in the user interface gallery; and
   reusing the custom data type in the database.

2. The method of claim 1 further comprising reusing the custom data type in at least one other database.

3. The method of claim 1, further comprising saving at least one field specific event as the custom data type.

4. The method of claim 1, further comprising saving a group of fields as the custom data type.

5. The method of claim 4, wherein saving the group of fields as the custom data type comprises saving at least one index, the at least one index referencing only fields in the group of fields.

6. The method of claim 4 further comprising attaching a field group layout template to at least one field in the group of fields, the field group layout template comprising instructions for displaying the group of fields within at least one of a form and a report comprising the group of fields.

7. The method of claim 6 further comprising displaying the group of fields in a stacked configuration based on the field group layout template.

8. The method of claim 6 further comprising displaying the group of fields in a tabular configuration based on the field group layout template.

9. A computer system for creating and reusing custom data types in a database, comprising:
- a memory for storing executable program code; and
- a processor, functionally coupled to the memory, the processor being responsive to computer-executable instructions contained in the program code and operative to:
  - provide a user interface gallery displaying a plurality of rows of default data types, the displayed plurality of rows of the default data types comprising a plurality of disparate data types and a plurality of data type categories, the user interface gallery further displaying at least one of the plurality of data type categories as one of the default data types in another one of the plurality of data type categories, the default data types being associated with a displayed database, the default data types being utilized in creating the custom data types;
  - receive a selection of a first field and a second field from a database table in the database, the first filed and the second field comprising a set of field properties;
  - receive, in the user interface gallery, an input to initiate saving the field properties associated with the selected first field and second field for creating a custom data type;
  - save the field properties and custom data type information as the custom data type, the custom data type information including any one of: a name, an icon, a category, a preview image or a description;
  - display the custom data type in the user interface gallery;
  - receive a selection of the custom data type from the user interface gallery, the custom data type comprising a plurality of the default data types displayed in the user interface gallery; and
  - reuse the custom data type in the database.

10. The system of claim 9, wherein the processor is further operative to reuse the custom data type in at least one other-database.

11. The system of claim 9, wherein the processor is further operative to save at least one field specific event as the custom data type.

12. The system of claim 9, wherein the processor is further operative to save a group of fields as the custom data type.

13. The system of claim 12, wherein the processor in saving the group of fields as the custom data type is operative to save at least one index, the at least one index referencing only fields in the group of fields.

14. The system of claim 12, wherein the processor is further operative to attach a field group layout template to at least one field in the group of fields, the field group layout template comprising instructions for displaying the group of fields within at least one of a form and a report comprising the group of fields.

15. The system of claim 14, wherein the processor is further operative to display the group of fields in a stacked configuration based on the field group layout template.

16. The system of claim 14, wherein the processor is further operative to display the group of fields in a tabular configuration based on the field group layout template.

17. The system of claim 9, wherein the processor is further operative to generate a dialog for receiving the custom data type information.

18. A computer-readable storage medium, excluding signals, containing computer executable instructions which, when executed on a computer, will cause the computer to perform a method for creating and reusing custom data types in a database, comprising:
- providing a user interface gallery displaying a plurality of rows of default data types, the displayed plurality of rows of the default data types comprising a plurality of disparate data types and a plurality of data type categories, the user interface gallery further displaying at least one of the plurality of data type categories as one of the default data types in another one of the plurality of data type categories, the default data types being associated with a displayed database, the default data types being utilized in creating the custom data types;
- receiving a selection of a first field and a second field from a database table in the database, the first field and the second field comprising a set of field properties;
- receiving, in the user interface gallery, an input to initiate saving the field properties associated with the selected first field and second field for creating a custom data type;
- generating a dialog for receiving custom data type information, the custom data type information including any one of: a name, an icon, a category, a preview image or a description;
- saving the field properties and the custom data type information as the custom data type;
- displaying the custom data type in the user interface gallery, the custom data type comprising a plurality of the default data types displayed in the user interface gallery; and
- reusing the custom data type in the database.

19. The computer-readable storage medium of claim 18 further comprising reusing the custom data type in at least one database.

* * * * *